(12) United States Patent
Manfredotti

(10) Patent No.: US 7,731,287 B2
(45) Date of Patent: Jun. 8, 2010

(54) VIBRATION ABSORBER DEVICE FOR A SEAT IN A VEHICLE, IN PARTICULAR AN AIRCRAFT OR THE LIKE

(75) Inventor: Thomas Manfredotti, La Colle sur Loup (FR)

(73) Assignee: Eurocopter, Marignane (FR)

( * ) Notice: Subject to any disclaimer, the term of this patent is extended or adjusted under 35 U.S.C. 154(b) by 343 days.

(21) Appl. No.: 11/015,639

(22) Filed: Dec. 20, 2004

(65) Prior Publication Data
US 2005/0168043 A1 Aug. 4, 2005

(30) Foreign Application Priority Data
Dec. 18, 2003 (FR) .................................. 03 14927

(51) Int. Cl.
*B60N 2/50* (2006.01)
(52) U.S. Cl. ................. 297/337; 297/216.1; 244/122 R
(58) Field of Classification Search .............. 244/118.6, 244/122 R; 297/216.1, 216.16, 216.18, 216.11, 297/216.12, 216.13, 216.14, 216.15, 216.17, 297/216.19, 216.2, 311, 337, 344.1, 344.11
See application file for complete search history.

(56) References Cited

U.S. PATENT DOCUMENTS

| | | | | |
|---|---|---|---|---|
| 2,816,871 A | * | 12/1957 | Fish ......................... | 297/217.1 |
| 3,420,475 A | | 1/1969 | Castillo et al. | |
| 3,568,972 A | * | 3/1971 | Sherman ..................... | 248/419 |
| 4,003,534 A | | 1/1977 | Kenigsberg et al. | |
| 4,191,424 A | * | 3/1980 | Mundell ................. | 297/452.26 |
| 4,636,006 A | * | 1/1987 | Kazaoka et al. ......... | 297/452.23 |
| 4,674,801 A | * | 6/1987 | DiPaola et al. .............. | 297/472 |
| 4,687,250 A | * | 8/1987 | Esche ...................... | 297/300.5 |
| 4,712,834 A | * | 12/1987 | Warrick ................... | 297/284.2 |
| 4,842,257 A | * | 6/1989 | Abu-Isa et al. .............. | 267/133 |
| 4,860,507 A | | 8/1989 | Garza-Tamez | |
| 4,911,381 A | * | 3/1990 | Cannon et al. .......... | 244/122 R |
| 5,058,952 A | * | 10/1991 | LaSota ..................... | 297/284.2 |
| 5,653,506 A | * | 8/1997 | Wisner et al. ............ | 297/344.1 |
| 5,673,972 A | * | 10/1997 | Dudash et al. ......... | 297/378.12 |
| 5,735,578 A | * | 4/1998 | Penley ................... | 297/440.11 |
| 5,788,185 A | * | 8/1998 | Hooper ................... | 244/122 R |
| 5,836,647 A | * | 11/1998 | Turman ................... | 297/216.1 |

(Continued)

FOREIGN PATENT DOCUMENTS

CH 654 734 3/1986

(Continued)

OTHER PUBLICATIONS

Definition of "pendular" from www.dictionary.com printed page included.*

*Primary Examiner*—Benjamin P Lee
(74) *Attorney, Agent, or Firm*—Young & Thompson

(57) ABSTRACT

A framework fixed to the structure of a vehicle, which framework carries a generally planar seat proper via mobility structure for providing the seat proper with mobility relative to the framework. The seat proper is rigid and is suspended from the framework via a deformable structure which is deformable in at least one of the dimensions of the plane of the seat proper. The plane of the framework for supporting the seat proper is disposed above the plane of the seat proper that is supported by the framework, so as to impart a pendular type structure to the structure providing mobility to the seat proper relative to the framework.

4 Claims, 2 Drawing Sheets

U.S. PATENT DOCUMENTS

| | | | |
|---|---|---|---|
| 5,868,472 A * | 2/1999 | Grilliot et al. | 297/452.18 |
| 6,115,972 A | 9/2000 | Tamez | |
| 6,361,115 B1 * | 3/2002 | Aufrere et al. | 297/452.18 |
| 6,585,190 B2 * | 7/2003 | Mort | 244/122 R |
| 6,719,368 B1 * | 4/2004 | Neale | 297/216.14 |
| 2003/0193231 A1 * | 10/2003 | Fujita et al. | 297/452.56 |
| 2004/0075312 A1 * | 4/2004 | Neale | 297/216.12 |
| 2006/0055214 A1 * | 3/2006 | Serber | 297/216.1 |

FOREIGN PATENT DOCUMENTS

| | | | |
|---|---|---|---|
| CH | 654734 | * | 3/1986 |
| FR | 2 411 103 | | 7/1979 |
| FR | 2 727 933 | | 6/1996 |

* cited by examiner

VIBRATION ABSORBER DEVICE FOR A SEAT IN A VEHICLE, IN PARTICULAR AN AIRCRAFT OR THE LIKE The present invention relates to the field of arrangements for seats in vehicles, and more particularly in aircraft or the like. The invention provides a device for fitting to such a seat in order to absorb the vibration generated by the displacement of the vehicle.

BACKGROUND OF THE INVENTION

A vehicle is subjected to vibration while it is moving. The vibration is transmitted to the seat, which is uncomfortable and inconvenient for passengers. This applies in particular to aircraft or the like, such as a helicopter, in which the vibration generated by the displacement of the vehicle is at a high frequency, such as, for example, a frequency lying in the range 10 hertz (Hz) to 25 Hz, approximately, at an amplitude that is small compared with the movements commonly induced for the passenger because of the progress of the vehicle.

As a result, a general problem that arises in the field lies in finding arrangements for seats to absorb such vibration in such a manner as to avoid transmitting them to passengers.

Proposals have been made for arrangements for the seats proper of seats in order to damp the movements induced for passengers during progress of the vehicle. Such seats proper are secured to the chassis of the vehicle and are organized as flexible elements, e.g. being constituted by a block of foam or a lattice of straps under tension.

It is found that such arrangements do not provide satisfactory stability as is desired for a passenger, in particular along the passenger's gravity axis. Furthermore, such arrangements are unsuitable for absorbing vibration of the type mentioned above, in particular for a vehicle of the aircraft type.

Proposals have also been made to interpose elastically deformable means between the seat and the chassis of the vehicle, or between a seat proper and a framework carrying it, in order to damp the jolts that are caused by progress of the vehicle. Nevertheless, such damper means are found to present the drawback of being too flexible, and unsuitable for absorbing vibration of the above-mentioned type, at least not without significantly and unacceptably increasing the weight and/or the size thereof in order to stiffen their flexibility. It should be observed that any such increase in weight and size is particularly unsuitable for use in aircraft. Furthermore, since passengers are likely to present significant differences in corpulence, such arrangements whose effectiveness depends on the weight that the damper means are able to support, are themselves unsuited for performing their desired function of absorbing vibration, when faced with the potential for seats to be used by passengers presenting a variety of previously unidentified sizes.

Proposals have also been made for seats in which the seat proper is supported by a vehicle structure via co-operating means to enable the seat proper to slide relative to the vehicle structure, where such means may be wheels or the like traveling in slideways. A drawback of arrangements of that type lies in the unacceptable friction between the co-operating members leading to specific forces preventing the seat proper from moving relative to the vehicle structure, and thus countering the looked-for effect of absorbing vibration. Furthermore, another drawback lies in the mechanical relationship involved between the co-operating members and the stresses that result against them, thereby leading to unsuitable jolts being produced.

Finally, it is found that the difficulties to be overcome in the field lie in particular in arranging a seat for a vehicle that is suitable for absorbing vibration at relatively high frequency while not being of very large amplitude, in the face of the movements that are commonly induced on the passenger because of the progress of the vehicle and because of the directional movements thereof. In particular, such an arrangement must enable said vibration to be absorbed in the general plane of the seat proper, but without thereby transmitting jolts or instability to the passenger along the passenger's gravity axis in particular. Furthermore, such an arrangement must provide such a facility for absorbing vibration in spite of supporting passengers of previously unidentified corpulence that can lie in a relatively large range. In addition, in particular for implementation in an aircraft or the like, such an arrangement must present size and weight that are as small as possible, and must do so at a cost that is acceptable.

OBJECTS AND SUMMARY OF THE INVENTION

The object of the present invention is to propose a vibration-absorber device for a seat in a vehicle, in particular an aircraft or the like, having an organization that enables the above-mentioned difficulties to be overcome.

The device of the present invention is intended to absorb vibration in the seat of a vehicle, in particular an aircraft or the like. The device comprises a framework secured to the vehicle chassis and carrying a generally planar seat proper via mobility means allowing the seat proper to move relative to the framework. In the present invention, the seat proper is rigid and is suspended from the framework via a structure that is deformable in at least one of the dimensions of the plane of the seat proper. The framework plane for supporting the seat proper is located above the support plane whereby the seat proper is supported by the framework, so as to confer a deformable structure of pendular type to the mobility means enabling the seat proper to move relative to the framework.

By means of these dispositions, vibration absorption is obtained independently of the weight of the passenger. In addition, the frequency range of the vibration to be absorbed is easily adjusted by selecting the operating distance of the pendular structure, corresponding to the distance between the plane of the seat proper and the plane from which it is supported by the framework. Furthermore, the organization of the device makes it possible to use framework support members working in traction, with the advantage of obtaining the desired result of absorbing vibration without any risk of inducing movement for the passenger along his gravity axis in particular, while using elements of a weight that can be small when providing the looked-for qualities of mechanical strength. In addition, such a device naturally maintains the seat proper in its appropriate position relative to the framework, and thus relative to the vehicle, under drive from the weight both of the seat proper and of the passenger which total weight, under the effect of gravity, naturally tends to place the seat proper in a centered position relative to the framework supporting it.

It should be observed that in a preferred application of the device of the invention, the structure whereby the seat proper is suspended from the framework is deformable, in particular in the longitudinal direction of the seat proper, and more particularly transversely relative to the direction in which the vehicle progresses.

The framework is advantageously provided in the form of a generally planar hollow structure housing the seat proper together with its mobility means, so that the overall volume of the seat proper and its mobility means is contained within the overall volume of the framework. By means of these dispositions, the size of the device is limited to that of the framework. By way of an embodiment that is preferred because of its simplicity, the framework is arranged specifically as a rectangular frame housing the seat proper and its mobility means in the thickness of its opening.

In a preferred embodiment, the deformable pendular structure of the mobility means for the seat proper is made up of a plurality of strands of cable connecting the framework and the seat proper to each other in succession.

The strands of cable are secured specifically to the framework and to the seat proper via sets of engagement members, the engagement members in each of the sets being allocated respectively to the framework and to the seat proper by being disposed in the corresponding planes thereof which are allocated thereto. The sets of engagement members are distributed in pluralities along the corresponding sides of the framework and of the seat proper, and in particular along their side edge faces.

These dispositions are such that the strands of cable are naturally put under tension by the weight of a passenger prior to the device of the invention coming into operation. Furthermore, the use of elements of cabling for forming the pendular mobility means makes it possible to reduce the size and the weight thereof. Furthermore, since the connection between the framework and the seat proper is made by a succession of strands of cable, which can be distributed equally well as independent strands of cable and/or as successive strands coming from a single cable, the weight of the passenger is shared over a plurality of sections of cable, thus making it possible to further reduce the size and the weight of the mobility means imparting mobility to the seat proper relative to the framework.

The strands of cable preferably come from a single cable which extends substantially along at least one of the dimensions of the plane of the seat proper, being engaged successively on the engagement members. It will be understood that a single cable can be allocated to at least two opposite sides of the seat proper in the direction corresponding to its plane, but that it is preferable to give each of those sides of the seat proper its own independent cable.

The engagement members may be constituted, for example, by studs with the cable being wound around each of them, or else and preferably by clamps for taking hold of the cable to guarantee a said operating distance for the pendular structure that is limited to the corresponding distance between the engagement members in a given set which are respectively allocated to the planes corresponding to the seat proper and to the carrying framework, with this applying in spite of the same continuous cable being used to extend along the corresponding dimension of the plane of the seat proper.

In another approach of the present invention, the assembly formed by the framework, the seat proper, and the mobility means can be organized as a deformable parallelogram structure.

In a variant embodiment of the present invention, described merely to illustrate such a deformable parallelogram organization, the deformable structure of the pendular mobility means for the seat proper is made up of a set of links interposed between the framework and the seat proper. The links are hinged at their respective ends to the framework and to the seat proper in at least one of the dimensions of the plane of the seat proper, and for example omnidirectionally by using ball joints.

In another variant embodiment of the present invention, the pendular deformable structure of the mobility means for the seat proper is made up of a set of elastically deformable members interposed between the framework and the seat proper, to which the members are fixed at respective ends. By way of example, the members may be constituted by flexible blades, which could equally well be made of a single material and/or of multiple superposed layers of respective materials.

Preferably, the device of the invention is associated with a passenger safety device for preventing the seat proper sliding towards the back of the passenger's knees in the event of an accident or of the mobility means connecting the seat proper to the framework rupturing or being spoilt. For this purpose, the seat proper is fitted, for example, with means for restraining movement thereof beyond the overall volume defined by the framework, so as to prevent the seat proper from escaping out from the framework in the event of the mobility means connecting the seat proper to the framework rupturing.

BRIEF DESCRIPTION OF THE DRAWINGS

The present invention will be better understood, and details relating thereto will appear on reading the following description of a preferred embodiment given with reference to the figures of the accompanying sheets of drawings, in which.

MORE DETAILED DESCRIPTION

Figure 1:
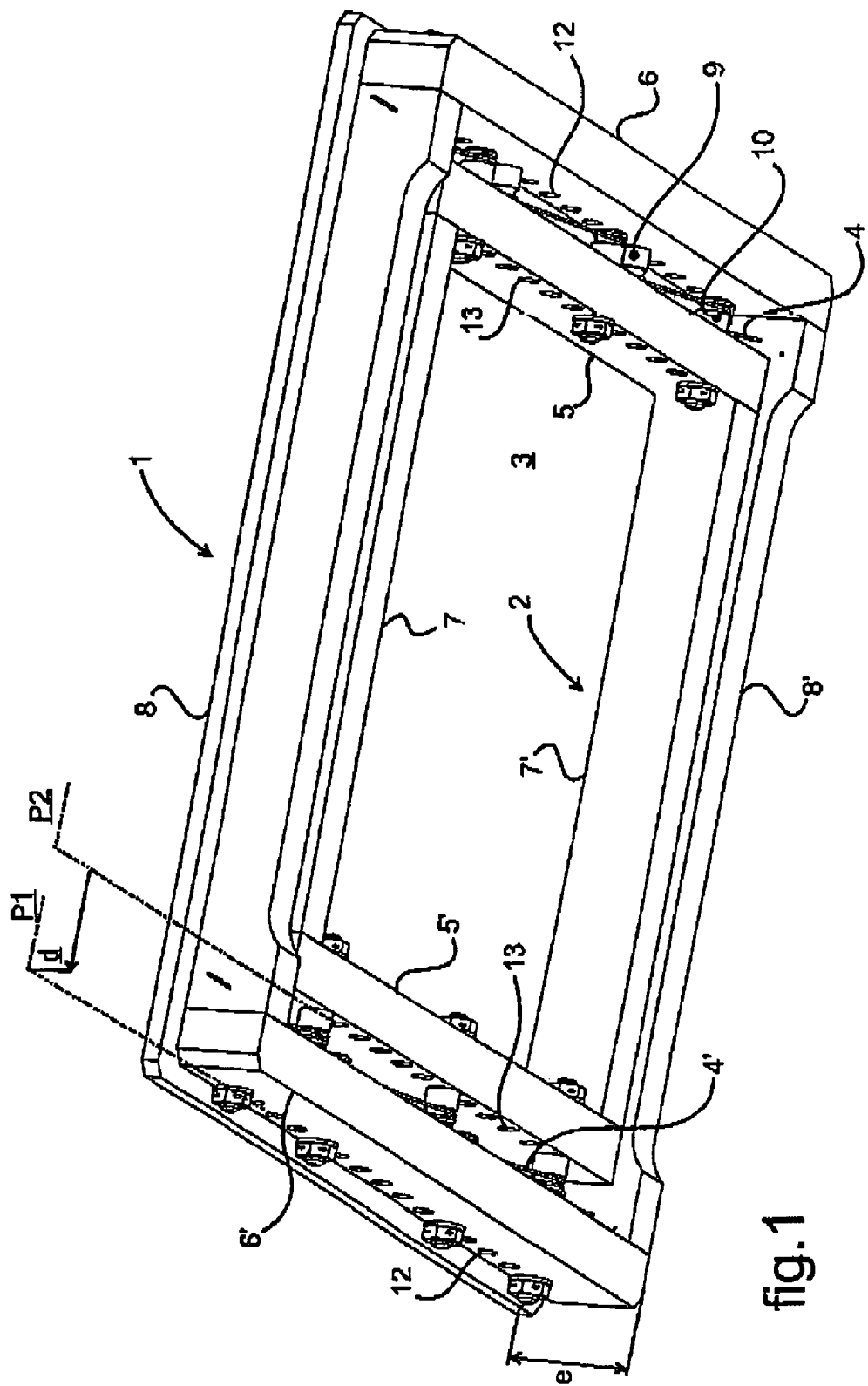
FIG. 1 is a perspective view from below showing an embodiment of a device of the present invention for absorbing vibration transmitted to the seat of a vehicle.
Figure 2:
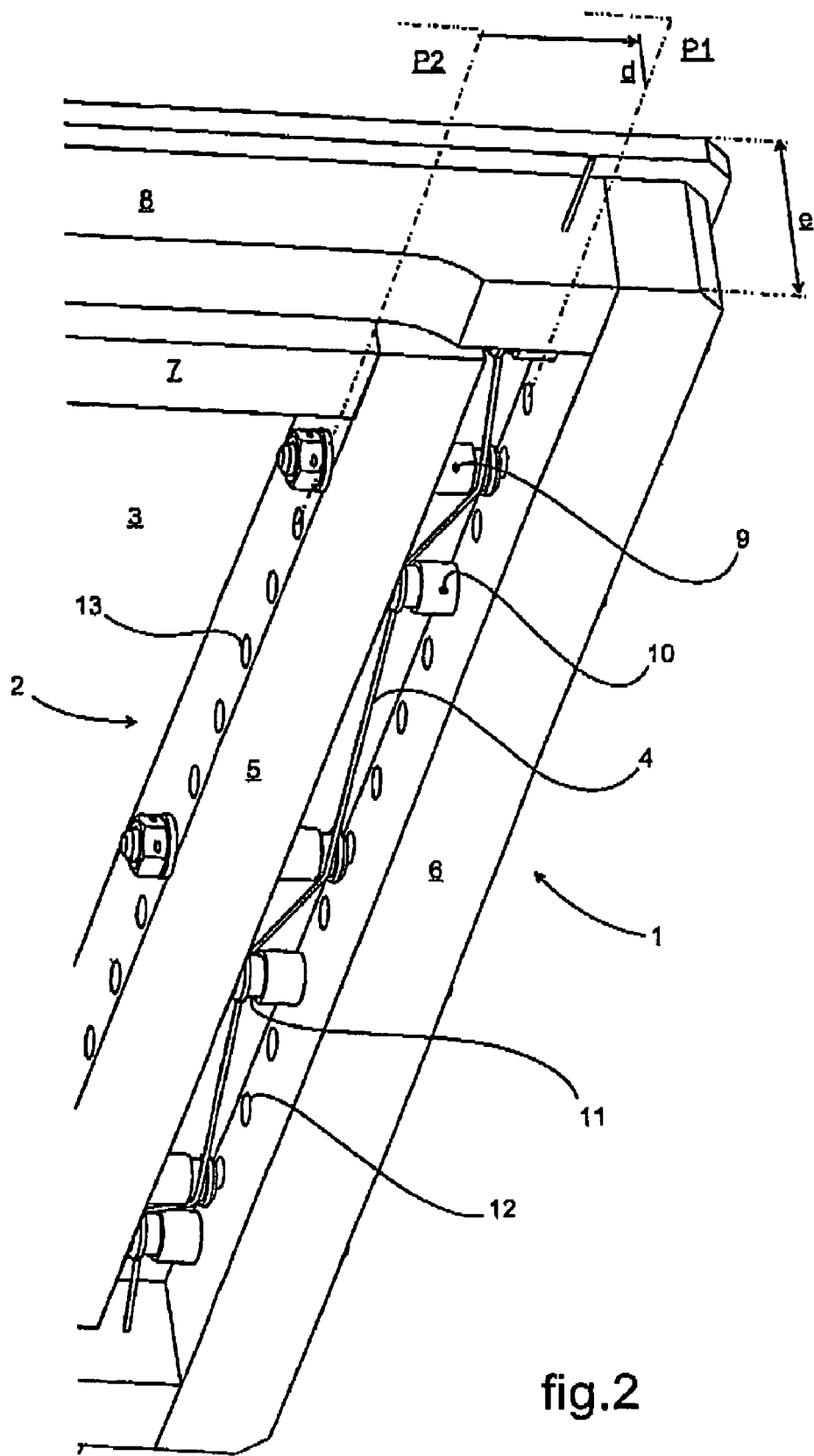
FIG. 2 is a detail view in perspective from below showing how the connection is made between a framework and a seat proper in the device shown in FIG. 1.

In the figures, a seat for a vehicle comprises a framework 1 supporting a seat proper 2, both organized as rectangular frames. The framework 1 houses the seat proper 2 in the thickness of its own opening 3, so that the overall size of the device corresponds to the overall size of the framework 1. By way of indication, and in order to further clarify the present invention with reference to size constraints, the thickness e of the frame constituting the framework 1 may lie in the range approximately 30 millimeters (mm) to 40 mm.

The seat proper 2 is suspended from the framework 1 by a set of cables 4 and 4' respectively allocated to two opposite sides 5 and 5' of the seat proper 2 and the corresponding sides 6 and 6' of the framework 1, and in particular their lateral sides in the preferred embodiment that is shown, for the purpose of absorbing vibration in the longitudinal direction of the general plane of the seat proper 2. Nevertheless, it will be understood that the invention is applicable, independently or in combination with the embodiment shown, to the seat proper 2 being supported by the framework 1 via the respective longitudinal sides 7, 7', and 8, 8' thereof, in order to absorb vibration in the transverse direction of the general plane of the seat proper 2, corresponding to the axis along which the vehicle progresses.

The framework's plane P1 of the framework 1 for supporting the seat proper 2 is disposed above the support plane P2 via which the seat proper 2 is supported by the framework 1, so as to cause their connection to be of the type whereby the seat proper 2 is suspended in pendular manner from the framework 1. This results in particular in vibration being absorbed independently of passenger weight, as a function of the distance d between the two planes P1 and P2, along the gravity axis of the seat, in particular.

Each cable 4 and 4' is fixed to the framework 1 and to the seat proper 2 via engagement members 9 and 10 which are distributed in pairs by set along the corresponding sides 5, 6, and 5', 6' of the seat proper 2 and of the framework 1. A strand of cable 4, 4' extends between the engagement members 9 and 10 of each of the sets, so that each strand of cable 4, 4' constitutes an independent member for the seat proper 2 being carried in suspension by the framework 1. By way of example, in the embodiment shown, these engagement members 9 and 10 are constituted by studs that are secured respectively to the seat proper 2 and to the framework 1. It should be observed that these studs have respective grooves 11 for receiving at least one turn of the cable 4, 4' for securing the cable 4, 4' to each of the engagement members and so as to define the length of each of the strands of cable 4, 4'.

It should be observed that the framework 1 and the seat proper 2 each have a plurality of receiver members 12 and 13 for receiving the engagement members 9 and 10, said receiver members being provided in greater number than the engagement members 9, 10 so as to enable the positions of the engagement members 9 and 10 to be adjusted along the corresponding sides 5, 6 and 5', 6' of the seat proper 2 and the framework 1.

In the embodiment shown, the members 12, 13 for receiving the engagement members 9, 10 are constituted by holes made through the corresponding sides 5, 6 and 5', 6' of the seat proper 2 and the framework 1. It should be observed that this embodiment organizes the means for adjusting the position of the engagement members 9, 10 as adjustment means that are discrete, but that in a variant not shown these means for adjusting the positions of the engagement means 9, 10 could be means for continuously adjusting said positions, of the type comprising a slideway or the like, for example.

It will be understood that the rigid structure of the seat proper, in particular the structure in the shape of a rectangular frame, is designed to be covered, e.g. by a block of foam or the like.

What is claimed is:

1. A vehicle seat having a device for absorbing vibration, comprising a framework adapted to be fixed to the chassis of the vehicle, and carrying a generally planar seat via mobility means that allow the seat to move relative to the framework with pendular movement, wherein the seat is rigid and suspended pendularly from the framework by non-elastic means for pendular movement relative to the framework, wherein the seat defines a support plane and the framework defines a parallel framework plane offset from said support plane;

wherein the mobility means of the seat is made up of a plurality of strands of flexible cable successively connecting the framework and the seat to each other, with the strands of cable being secured thereto via sets of engagement members, the engagement members in each of the sets being allocated respectively to the framework and to the seat;

wherein at least one of said engagement members is disposed in the support plane and at least one is disposed in the framework plane;

the sets of engagement members being distributed at pluralities along the corresponding sides of the framework and of the seat, and wherein the strands of the cable extend through the support plane and the framework plane to pendularly suspend the seat from the framework by successively engaging said engagement members.

2. A device according to claim 1, wherein the framework is a frame housing the seat and its mobility means in such a manner that the overall volume of the seat and its mobility means lies within the overall volume of the framework.

3. A device according to claim 2, wherein the framework is arranged as a rectangular frame housing the seat and its mobility means in the thickness of its opening.

4. A device according to claim 1, wherein said engagement members are constituted by studs having the cable wound around each of them.

* * * * *